United States Patent
Coward

(10) Patent No.: US 7,500,370 B2
(45) Date of Patent: Mar. 10, 2009

(54) SYSTEM AND METHOD FOR COORDINATION AND OPTIMIZATION OF LIQUEFIED NATURAL GAS (LNG) PROCESSES

(75) Inventor: Brian A. Coward, Southampton (GB)

(73) Assignee: Honeywell International Inc., Morristown, NJ (US)

( * ) Notice: Subject to any disclaimer, the term of this patent is extended or adjusted under 35 U.S.C. 154(b) by 462 days.

(21) Appl. No.: 11/394,796

(22) Filed: Mar. 31, 2006

(65) Prior Publication Data

US 2007/0227187 A1 Oct. 4, 2007

(51) Int. Cl.
F25B 3/00 (2006.01)

(52) U.S. Cl. ............................... 62/657; 62/620

(58) Field of Classification Search ............ 62/657, 62/620
See application file for complete search history.

(56) References Cited

U.S. PATENT DOCUMENTS

| | | | |
|---|---|---|---|
| 4,685,522 A | 8/1987 | Dixon et al. | |
| 6,434,435 B1 | 8/2002 | Tubel et al. | |
| 6,454,002 B1 | 9/2002 | Stokes et al. | |
| 6,793,712 B2 * | 9/2004 | Qualls ........................... | 95/92 |
| 6,964,181 B1 * | 11/2005 | Milios et al. .................. | 62/620 |
| 2004/0216514 A1 | 11/2004 | Nunnally et al. | |
| 2004/0244415 A1 * | 12/2004 | Paradowski ................... | 62/612 |
| 2005/0284176 A1 | 12/2005 | Eaton et al. | |
| 2007/0012072 A1 * | 1/2007 | Qualls et al. .................. | 62/613 |
| 2007/0275471 A1 | 11/2007 | Coward | |
| 2007/0276542 A1 | 11/2007 | Coward | |

FOREIGN PATENT DOCUMENTS

| | | |
|---|---|---|
| WO | WO 00/00715 A1 | 1/2000 |
| WO | WO 2004/038535 A2 | 5/2004 |
| WO | WO 2004/070569 A2 | 8/2004 |

OTHER PUBLICATIONS

L.A. Saputelli et al., "Promoting Real-Time Optimization of Hydrocarbon Producing Systems", Society of Petroleum Engineers, Sep. 2003, 9 pages.
K. K. Lo, "Optimum Lift-Gas Allocations Under Multiple Production Constraints", Society of Petroleum Engineers, vol. SPE, No. 26017, Dec. 7, 1992, pp. 1-23.
B. Stenhouse, "Learnings on Sustainable Model-Based Optimisation—The Valhall Optimiser Field Trial", SPE International, Apr. 2006, 15 pages.
L. Saputelli, "Self-Learning Reservoir Management", Dec. 2005, SPE Reservoir Evaluation & Engineering, pp. 534-547.

* cited by examiner

Primary Examiner—William C Doerrler
(74) Attorney, Agent, or Firm—Munck Carter, P.C.

(57) ABSTRACT

A method includes controlling a first process using a first process control system. The method also includes controlling a second process using a second process control system. The method further includes controlling the first and second process control systems together. In addition, the method includes optimizing at least one process objective using both the first and second process control systems. The first process can be a natural gas liquids production process, and the second process can be a liquefied natural gas production process. The process objective could include at least one of: profit, natural gas liquids quantity, natural gas liquids quality, liquefied natural gas quantity, and liquefied natural gas quality.

20 Claims, 5 Drawing Sheets

US 7,500,370 B2

SYSTEM AND METHOD FOR COORDINATION AND OPTIMIZATION OF LIQUEFIED NATURAL GAS (LNG) PROCESSES

TECHNICAL FIELD

This disclosure relates generally to process control systems and more particularly to a system and method for coordination and optimization of liquefied natural gas (LNG) processes.

BACKGROUND

In the upstream production of hydrocarbons, certain reservoirs typically produce oil, while others typically produce gas and condensed natural gas liquids (NGL). The price of NGL is often close to the price of crude oil, making it a high value product. Also, the gas that is associated with the NGL is typically rich in ethane and methane and is therefore useful as a source of fuel. However, the gas is typically difficult to transport by pipeline and is typically produced in locations remote from the main areas of demand.

By liquefying the gas at low temperatures, the volume of the gas is reduced (such as by a factor of 600). This process allows tankers to transport liquefied natural gas (LNG) by sea more economically than by pipeline. The production of LNG is a growing industry, with more production plants being built worldwide to cater to the increasing demand from countries such as the United States, the United Kingdom, and Japan. The LNG process is normally located as close as possible to offshore production facilities due to the quantity of gas and entrained liquids involved. The production of LNG from a single site could exceed ten million tons per year.

The produced LNG is typically sold on a "heating value" basis, meaning there is a value in U.S. dollars (typically per million British Thermal Units or BTUs) that the LNG is sold against. An LNG production plant typically runs to a quality on either a Lower Heating Value (LHV) or a Higher Heating Value (HHV) for the LNG being produced. The heating value is often affected by the quality of the feedstock, which is fed to the process, and the operation of the processing itself. The processing of the feedstock in an LNG train can be controlled using advanced process control techniques.

The feedstock to the LNG process is often impacted by upstream operations. The normal method of running an upstream production process is to not consider the impact of the gas quality on downstream processing sites, but rather to look at the local production and to try and maximize local profitability. This choice is typically driven by how much NGL is produced from various wells. This often makes the higher NGL-yielding wells the preferential production wells, even though the gas quality may have a detrimental effect on the LNG quality.

SUMMARY

This disclosure provides a system and method for coordination and optimization of liquefied natural gas (LNG) processes.

In a first embodiment, a method includes controlling a first process using a first process control system and controlling a second process using a second process control system. The method also includes controlling the first and second process control systems together and optimizing at least one process objective using both the first and second process control systems. In particular embodiments, the first process is a natural gas liquids production process, and the second process is a liquefied natural gas production process.

In a second embodiment, an apparatus includes at least one processor capable of simultaneously controlling a first process control system that controls a first process and a second process control system that controls a second process. The processor is also capable of optimizing at least one process objective using both the first and second process control systems.

In a third embodiment, a computer program is embodied on a computer readable medium and is operable to be executed by a processor. The computer program includes computer readable program code for simultaneously controlling a first process control system that controls a first process and a second process control system that controls a second process. The computer program also includes computer readable program code for optimizing at least one process objective using both the first and second process control systems, where the first process is a natural gas liquids production process and the second process is a liquefied natural gas production process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
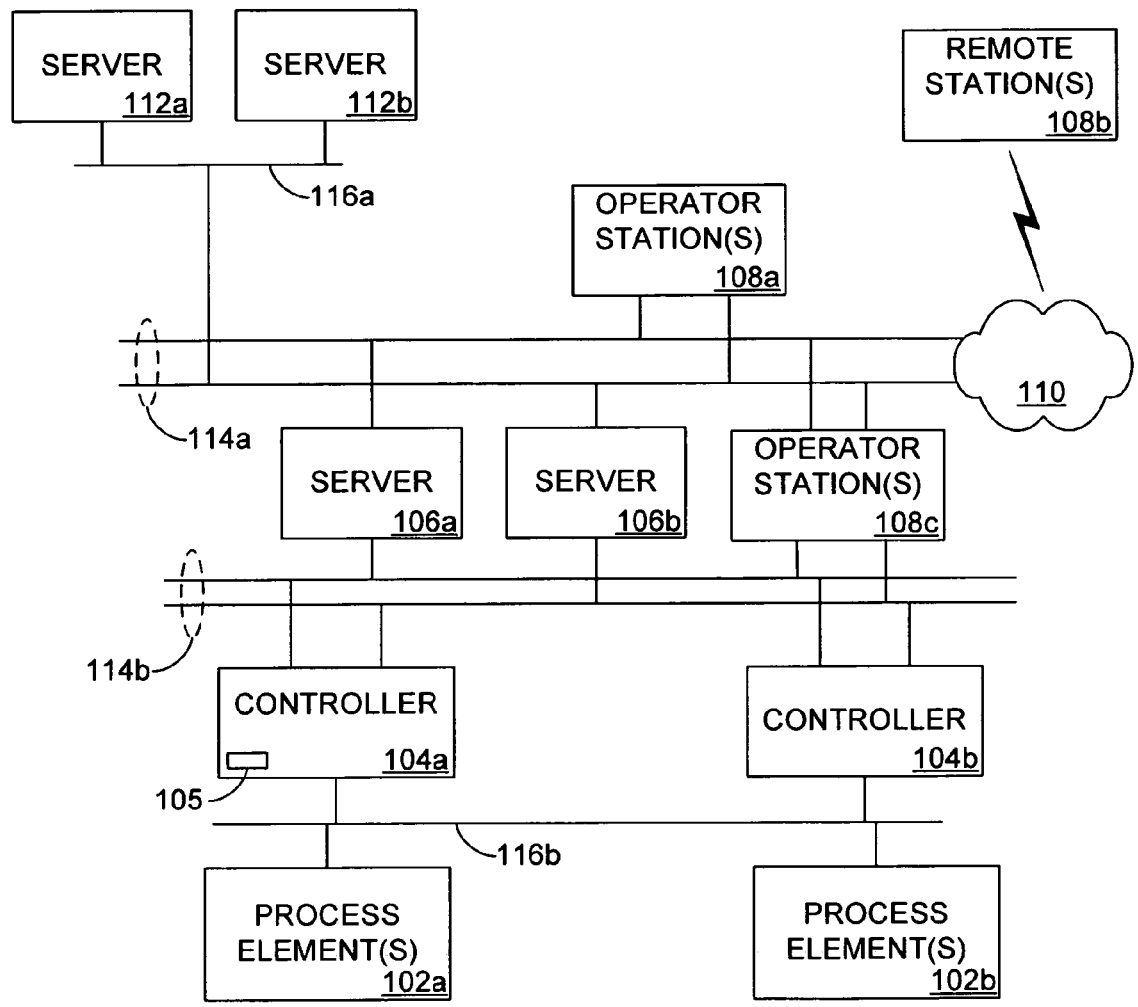
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system. While only two process elements 102a-102b are shown in this example, any number of process elements may be included in a particular implementation of the process control system 100.

Two controllers 104a-104b are coupled to the process elements 102a-102b. The controllers 104a-104b control the operation of the process elements 102a-102b. For example, the controllers 104a-104b could be capable of monitoring the operation of the process elements 102a-102b and providing control signals to the process elements 102a-102b. Each of the controllers 104a-104b includes any hardware, software, firmware, or combination thereof for controlling one or more of the process elements 102a-102b. The controllers 104a-104b could, for example, include processors 105 of the POWERPC processor family running the GREEN HILLS INTEGRITY operating system or processors 105 of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing a MICROSOFT WINDOWS operating system. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing user access to the controllers 104a-104b (without using resources of the servers 106a-106b). As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. The operator stations 108a-108c could, for example, represent personal computers having displays and processors executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 also includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116b that support communication between components in the system 100. Each of these networks 114a-114b, 116a-116b represents any suitable network or combination of networks facilitating communication between components in the system 100. The networks 114a-114b, 116a-116b could, for example, represent Ethernet networks. The process control system 100 could have any other suitable network topology according to particular needs.

Although FIG. 1 illustrates one example of a process control system 100, various changes may be made to FIG. 1. For example, a control system could include any number of process elements, controllers, servers, and operator stations.

Figure 2:
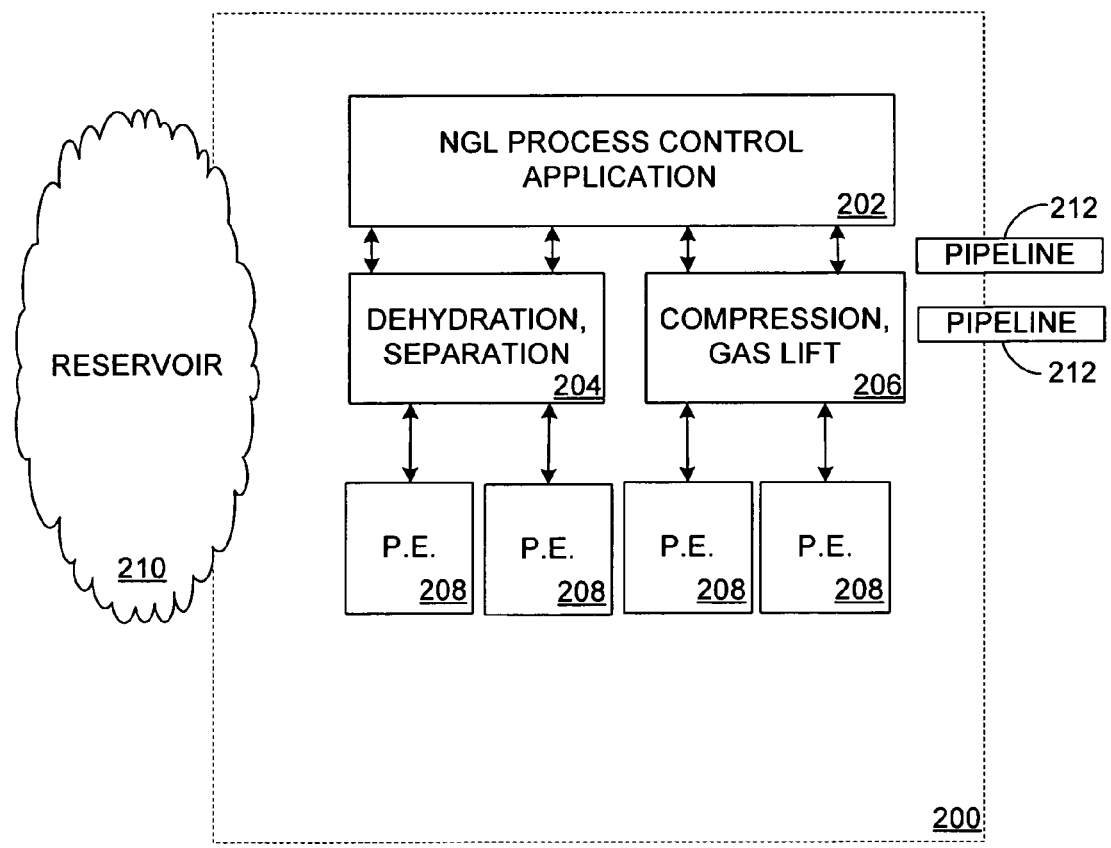
FIG. 2 illustrates an example process control system for a natural gas liquids (NGL) production processing operation according to one embodiment of this disclosure.

FIG. 2 illustrates an example process control system 200 for a natural gas liquids (NGL) production processing operation according to one embodiment of this disclosure. The embodiment of the process control system 200 shown in FIG. 2 is for illustration only. Other embodiments of the process control system 200 may be used without departing from the scope of this disclosure.

The process control system 200 of FIG. 2 serves to produce natural gas and natural gas liquids from one or more reservoirs 210 and deliver them to pipelines 212. The chemical and mechanical processes involved are well known to those of skill in the art. In this example, the process control system 200 includes a primary NGL process control application 202 that controls the sub-processes involved in system 200. The sub-processes include those executed by dehydration and separation controllers 204 and by compression and gas lift controllers 206. These controllers 204-206 in turn control various process elements 208 as described above with regard to the generic process control system of FIG. 1. The process control system 200 can be optimized for maximum natural gas liquids production, quality of natural gas liquids produced, and other process objectives.

Figure 3:
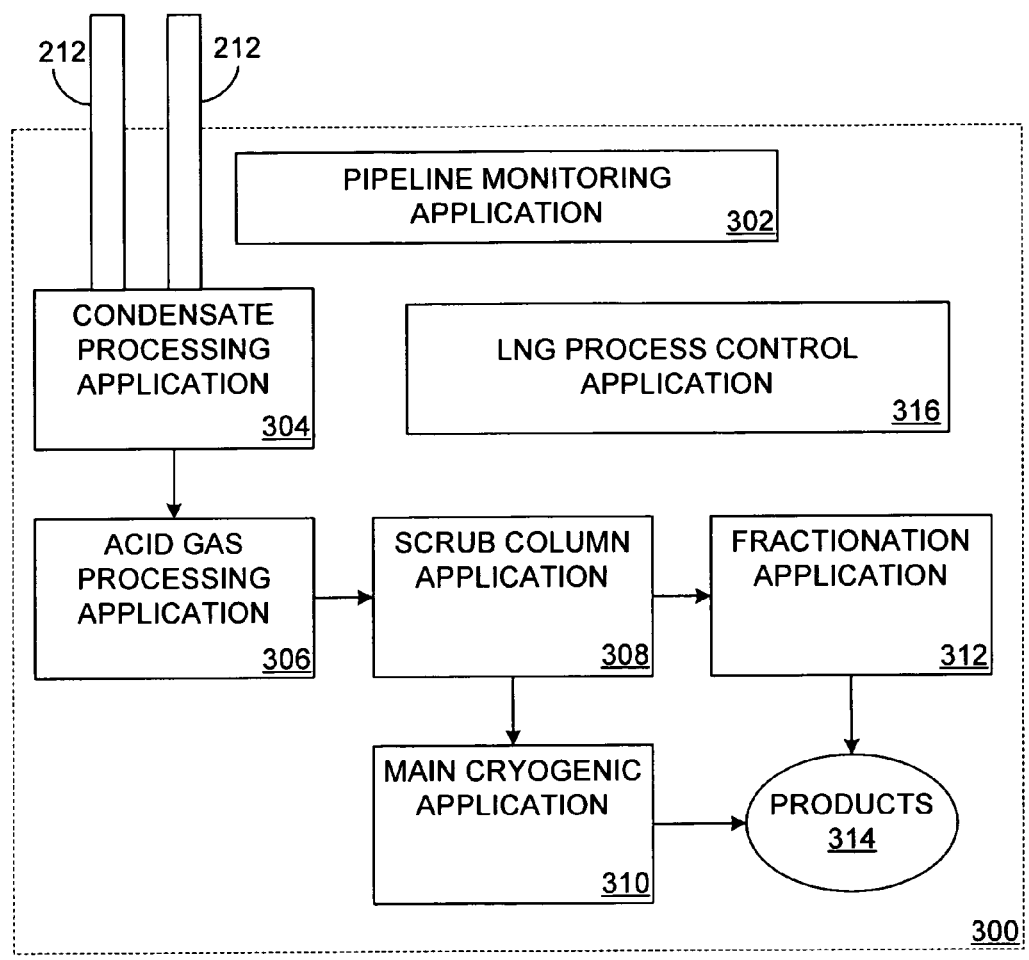
FIG. 3 illustrates an example process control system for a liquefied natural gas (LNG) production processing operation according to one embodiment of this disclosure.

FIG. 3 illustrates an example process control system 300 for a liquefied natural gas (LNG) production processing operation according to one embodiment of this disclosure. The embodiment of the process control system 300 shown in FIG. 3 is for illustration only. Other embodiments of the process control system 300 may be used without departing from the scope of this disclosure.

The process control system 300 of FIG. 3 servers to receive gas and natural gas liquids via pipelines 212 and process them into LNG products 314, such as liquefied natural gas and related products. The chemical and mechanical processes involved are well known to those of skill in the art. In this example, the process control system 300 includes a primary LNG process control application 316, which controls the sub-processes involved in the system 300. The sub-processes include those executed by a pipeline monitoring application 302, a condensate processing application 304, an acid gas processing application 306, a scrub column application 308, a main cryogenic application 310, and a fractionation application 312. Each of these applications can control multiple controllers and process elements as described above with regard to the generic process control system of FIG. 1. Each of the illustrated applications may communicate with the primary LNG process control application 316 and may communicate with each other. The process control system 300 may be optimized for maximum liquefied natural gas production, quality of liquefied natural gas produced, and other process objectives.

Figure 4:
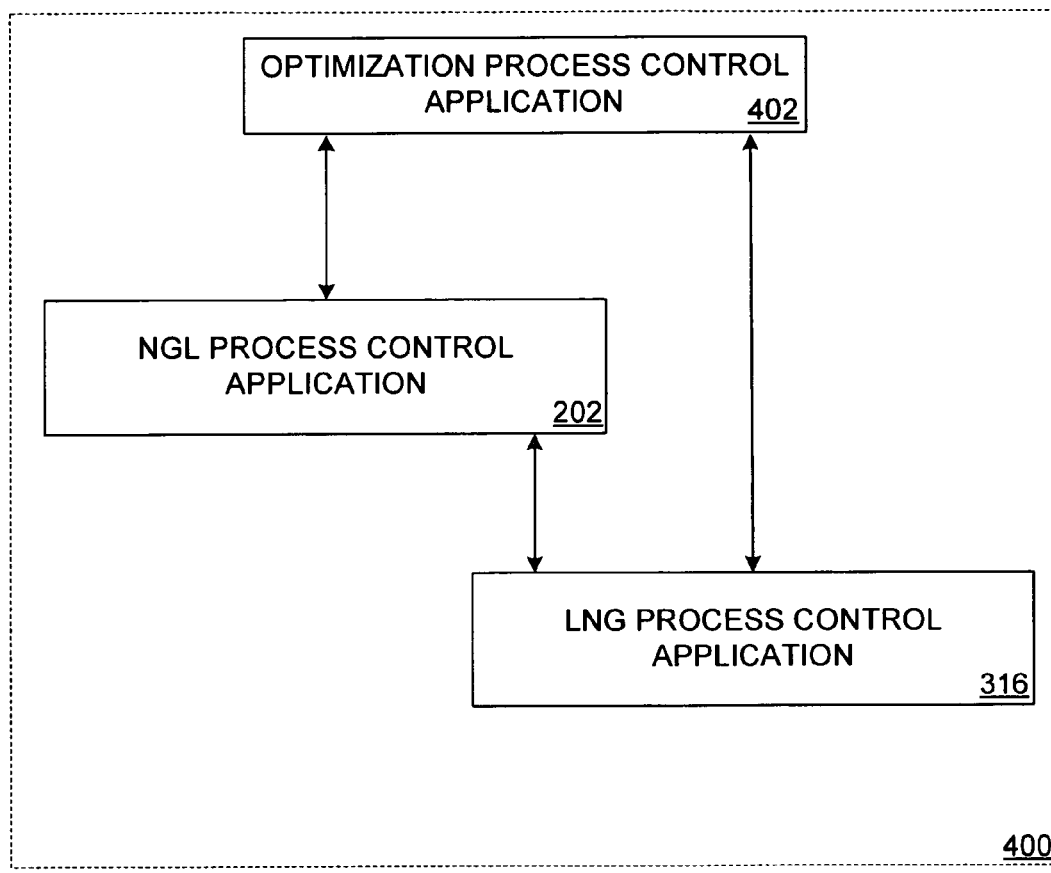
FIG. 4 illustrates an example process control system for optimization of NGL production processing and LNG production processing operations according to one embodiment of this disclosure.

FIG. 4 illustrates an example process control system 400 for optimization of NGL production processing and LNG production processing operations according to one embodiment of this disclosure. The embodiment of the process control system 400 shown in FIG. 4 is for illustration only. Other embodiments of the process control system 400 may be used without departing from the scope of this disclosure.

In general, the process control system 400 implements dynamic optimization and coordination techniques so that an improved or maximum recovery of high-value NGL is achieved, while an improved or optimal feed gas quality for an LNG train is also achieved. A "holistically best" operational point may be achieved for the entire production process, not simply the best point for just one asset in the operation. Optimizing the feed quality may ensure that the amount of inert gasses, such as nitrogen, in the LNG feed gas is maximized to the quality limitation. This may give an improved or maximum return on investment since inert gases are sold at LNG rates.

In particular embodiments, the control scheme is carefully coordinated, guaranteeing the quality specifications of the LNG. Advanced control and optimization techniques may be used for both upstream and LNG processes. In particular, dynamic coordination and optimization techniques may be used to coordinate the processes in the different locations and to drive the processes to a holistic optimum. This is advantageous because it may help to ensure timely coordination between locations and to drive the processes to an optimal economic point for the entire operation, not just a local process.

As shown in FIG. 4, the process control system 400 includes an optimization process control application 402, which communicates with and controls the NGL process control application 202 and the LNG process control application 316. In some embodiments, the NGL process control application 202 and the LNG process control application 316 can also communicate with each other. By performing high-level optimization and control over both "upstream" NGL production at the process control system 200 and "downstream" LNG processing at the process control system 300 together, overall process objectives can be optimized. This provides an advantage over conventional local-level optimization techniques that often provide overall inefficiencies. The process control system 400 can be optimized for maximum liquefied natural gas production, maximum natural gas liquids production, quality of liquefied natural gas produced, overall revenue or profit generation, and other process objectives.

In this document, the term "application" refers to one or more computer programs, sets of instructions, procedures, functions, objects, classes, instances, or related data adapted for implementation in a suitable computer language. An application may be configured to run and control a particular section of an operating process. An application could also be configured to maximize profit, quality, production, or other objectives. As a particular example, each application could be configured with or operate using manipulated variables (MV), controlled variables (CV), disturbance variables (DV), and a control horizon over which the application operates to ensure that the variables are brought inside limits specified by an operator. A controlled variable represents a variable that a controller attempts to maintain within a specified operating range or otherwise control. A manipulated variable represents a variable manipulated by the controller to control a controlled variable. A disturbance variable represents a variable that affects a controlled variable but that cannot be controlled by the controller.

In particular embodiments, to ensure that the application 402 utilizes any degrees of freedom to increase profitability or other defined objectives, the application 402 may be configured with either linear program (LP) economics or quadratic program (QP) economics. These two different economic optimization approaches use a minimization strategy described below, and the quadratic optimization also uses ideal resting values (or desired steady state values). The general form of an objective function is:

$$\text{Minimize } J = \sum_i b_i \times CV_i + \sum_i a_i^2 (CV_i - CV_{0i})^2 + \sum_j b_j \times MV_j + \sum_j a_{j2} (MV_j - MV_{0j})^2,$$

where:

$b_i$ represents the linear coefficient of the $i^{th}$ controlled variable;

$b_j$ represents the linear coefficient of the $j^{th}$ manipulated variable;

$a_i$ represents the quadratic coefficient of the $i^{th}$ controlled variable;

$a_j$ represents the quadratic coefficient of the $j^{th}$ manipulated variable;

$CV_i$ represents the actual resting value of the $i^{th}$ controlled variable; and $CV_{0i}$ represents the desired resting value of the $i^{th}$ controlled variable;

$MV_j$ represents the actual resting value of the $j^{th}$ manipulated variable; and $MV_{0j}$ represents the desired resting value of the $j^{th}$ manipulated variable.

As shown here, the optimization for each application can be complex since the scope of an application may contain upwards of twenty variables, each able to be incorporated into either a linear or quadratic optimization objective. Given that the production process may be sequential and that altering the limits on a product quality or rate on one application may affect another application, there is coordination between the various applications.

The following represents examples of how the various applications in the various process control systems may operate alone or in combination. These examples are for illustration and explanation only. The various applications could perform any other or additional operations according to particular needs.

The pipeline-monitoring application 302 monitors the materials in the pipelines 212, such as by measuring differential pressures across the pipelines 212. The application 302 also detects operational issues, such as the location of pigs, whether there are leaks, and where any leaks are located. The application 302 aids process decisions in the course of normal operations.

The rate of throughput in the downstream LNG processing is controlled by the LNG process control application 316. It is also affected by process capacity and factors (such as ambient temperature) that affect the potential capacity of the process. The rate of consumption of materials from the pipelines 212 affects the pressure in the pipelines 212 at the entry point to the process control system 300. This pressure also affects the quality of the non-LNG streams, such as the NGL or condensate.

The process control system 300 and any other systems that have a process unit fed from the pipelines 212 therefore can affect pressure at the supply point (the exit point of process control system 200). As a result, the process control system 200 controls the pressure at the supply point, which may involve increasing the rate to increase the pressure and vice versa. For example, to increase the rate, the process control system 200 could open choke valves on different wells fed from the reservoir 210. The one or more reservoirs 210 are typically accessed through different wells, and each of these wells often produces material that is of a different composition. The aggregate composition of the material entering the pipelines 212 is affected by the amount of material that is produced from each of the wells. When any of the wells produces inert gasses, the amount of inert gasses reaching the supply point is dictated by the relative amount of material from the inert gas producing wells compared to the remainder of the wells. The process control system 200 may adjust the choke valves based on the well that produces the highest quantity of NGL together with the gas, the well having the highest condensate to gas ratio (CGR), or according to other objectives. Once a well is fully open, the process control system 200 may move onto the next highest well and repeat the process until the required amount of gas is provided to increase the pressure at the supply point on the pipelines 212.

The process control system 200 also controls local process issues, such as the performance of the gas and liquid dehydration processes, choke valve positioning, production of sand volumes, and pressure balancing. As such, the process control system 200 may not monitor the compositional effect of its operations on the supply material to the LNG process controlled by the process control system 300. When there is more than one platform supplying material to the LNG process controlled by the process control system 300, overall feed composition control cannot be achieved unless the process control system 200 and the process control system 300 are in constant communication. With multiple independent processes, it is difficult to even maintain the supply point pressure at the correct level or to maintain the correct pressure and the correct composition of feed to ensure the optimal product composition.

The process control system 400 is therefore used to facilitate cooperation between the process control system 200 and the process control system 300. The optimization process control application 402 may automatically resolve and coordinate these local process issues, without requiring a high degree of operator interaction. The optimization process control application 402 may, for example, meet the requirements of maximized condensate recovery while also achieving suitable pressure on the inlet of the pipelines 212. As a particular example, the process control system 400, with the optimization process control application 402, may optimize the processes across multiple units, devices, or systems, such as the upstream processes as controlled by the process control system 200, the pipelines 212, and the LNG processes controlled by the process control system 300.

The operations of the process control systems 200-400 could be performed by any suitable hardware, software, firmware, or combination thereof. For example, each process control system could include one or more physical data processing systems. Also, some or all of the various operations and applications can be performed or executed on multiple systems or on a single system (as long as the one or more systems are connected to control the relevant controllers and process elements, wherever located).

The process control system 400 may provide true multi-unit optimization. It combines the control and optimization problems from different systems and then optimizes them together. This allows the process control system 400 to determine not only the holistically optimal operating point, but also the optimal path to that point. Because the process control system 400 coordinates the lower level multivariable controllers, the overall time to steady state can be hours or days.

In particular embodiments, the process control system 400 uses bridge models to link variables between applications with dynamic models. A lag in variables (such as the lag between attempting to increase pressure in the pipelines 212 and the actual increase in pressure) can be modeled with either a long lag or deadtime. The process control system 400 links the upstream and downstream applications such that variables like the supply pressure can be linked to the pipeline entry pressure and variables such as the ambient temperature can be transmitted back to the upstream applications. In this manner, the process control system 400 coordinates the applications across multiple upstream sites and includes the yield of material such as condensate or NGL into the holistic optimum and the yield from each site being controlled.

Wells for each reservoir 210 could also be compositionally linked into the process control system 400 such that their effect on downstream products is part of the overall coordination. In this way, the process control system 400 can also evaluate the exact mathematical relationship between a change in a choke valve's position on the upstream application and the exact effect on the LNG or fractionation train products. Thus, the condensate yield can be dynamically maximized to the constraint of the quality of the products, even though the time lag between the change in the choke valve position and the effect manifesting itself in the process may be long (such as in excess of eight to twelve hours).

Utilizing the dynamic transmission and coordination of constraints across the entire operation (from the wellhead in the upstream production area through to the product tanks in the LNG production site), the process control system 400 may enable higher production of valuable products such as NGL. Because the process control systems and applications may be layered, this implementation lends itself to the integration with models supporting other areas of the process. For example, reservoir models and online constraints such as reservoir velocities can be included into the control scheme to ensure that all constraints are considered within an optimization.

Although FIGS. 2 through 4 illustrate three process control systems, various changes may be made to FIGS. 2 through 4. For example, the functional divisions in FIGS. 2 through 4 are for illustration only. Various elements in FIGS. 2 through 4 could be combined or omitted and additional components could be added according to particular needs.

Figure 5:
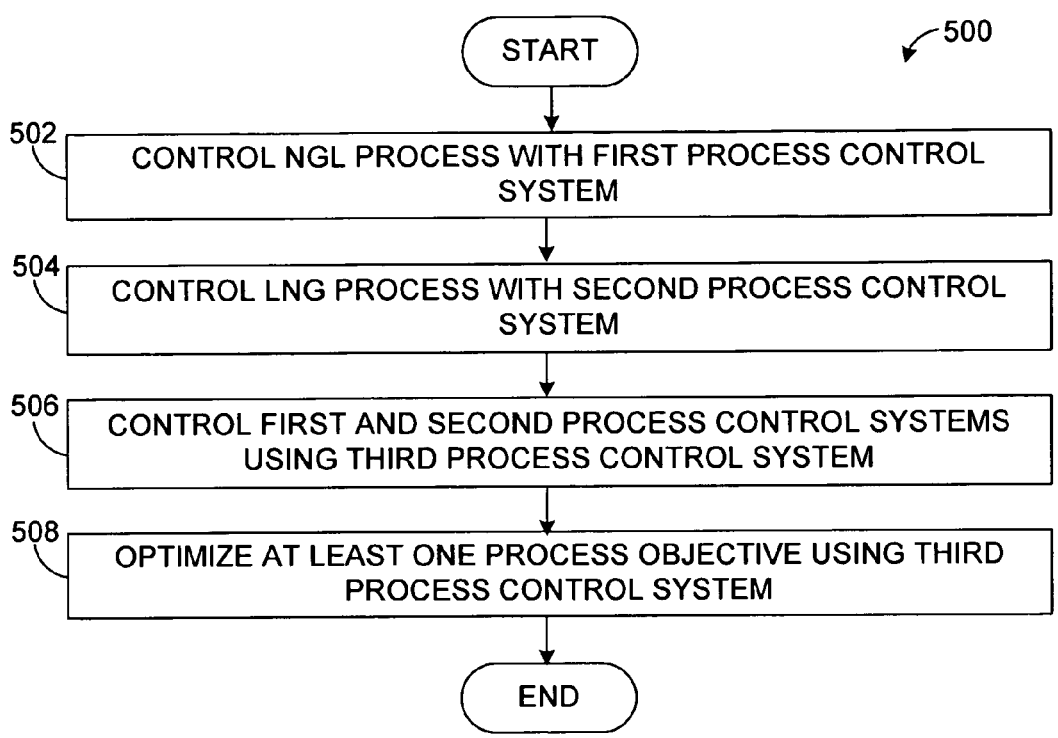
FIG. 5 illustrates an example method for coordination and optimization of LNG processes according to one embodiment of this disclosure.

FIG. 5 illustrates an example method 500 for coordination and optimization of LNG processes according to one embodiment of this disclosure. For ease of explanation, the method 500 is described with respect to the process control systems 200-400 described above with respect to FIGS. 2 through 4. The method 500 could be used by any suitable device and in any suitable system.

A first process control system controls the operations of an NGL production process from a reservoir at step 502. This may include, for example, the process control system 200 controlling the NGL production process.

A second process control system controls the operations of an LNG production process at step 504. This may include, for example, the process control system 300 controlling the LNG production process.

A third process control system controls the operations of the first and second process control systems at step 506. This may include, for example, the optimization process control application 402 in the process control system 400 coordinating and controlling the operations of the process control systems 200-300.

The third process control system optimizes operations of the first and second process control systems to optimize at least one process objective at step 508. This may include, for example, the optimization process control application 402 in the process control system 400 optimizing the operations of the process control systems 200-300. The process objective could include profit, product quality, product production quantity, or any other process objective or objectives.

Although FIG. 5 illustrates one example of a method 500 for coordination and optimization of LNG processes, various changes may be made to FIG. 5. For example, one, some, or all of the steps may occur as many times as needed. Also, while shown as a sequence of steps, various steps in FIG. 5 could occur in parallel or in a different order. As a particular example, all steps shown in FIG. 5 could be performed in parallel.

In some embodiments, the various functions performed in conjunction with the process management systems described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. For example, the teachings of this disclosure are not limited to use with NGL and LNG production systems but can be applied to any system where holistic process control of one or more typically-independent processes would be advantageous. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
controlling a first process using a first process control system, the first process comprising a natural gas liquids (NGL) production process, the first process supplying at least one pipeline;
controlling a second process using a second process control system, the second process comprising a liquefied natural gas (LNG) production process, the second process fed from the at least one pipeline; and
controlling the first and second process control systems together so as to optimize at least one process objective using both the first and second process control systems, wherein controlling the first and second process control systems comprises maintaining a pressure within the at least one pipeline at a desired level, wherein maintaining the pressure comprises adjusting at least one of multiple valves for at least one of multiple wells associated with a hydrocarbon reservoir, the wells feeding the NGL production process.

2. The method of claim 1, wherein maintaining the pressure comprises adjusting at least one of the valves based on an amount of inert gas provided by at least one of the wells.

3. The method of claim 2, wherein:
the process objective is to maximize recovery of natural gas liquids while optimizing feed gas provided to the LNG production process; and
optimizing the feed gas comprises maximizing, up to a threshold, an amount of the inert gas in the feed gas.

4. The method of claim 1, wherein the process objective is profit.

5. The method of claim 1, wherein the process objective is a quality of liquefied natural gas produced by the second process.

6. The method of claim 1, wherein the process objective is a quantity of liquefied natural gas produced by the second process.

7. The method of claim 1, wherein the process objective is a quantity of natural gas liquids produced by the first process.

8. The method of claim 1, wherein the first process control system is optimized for maximum natural gas liquids production.

9. The method of claim 1, wherein the first process control system is configured to control a plurality of controllers, each controller configured to control at least one sub-process.

10. The method of claim 1, wherein the second process control system is configured to control a plurality of sub-processes.

11. An apparatus, comprising:
at least one processor configured to:

simultaneously control a first process control system that controls a first process and a second process control system that controls a second process, the first process comprising a natural gas liquids (NGL) production process, the second process comprising a liquefied natural gas (LNG) production process, the first process supplying at least one pipeline that feeds the second process; and optimize at least one process objective using both the first and second process control systems;

wherein the at least one processor is configured to optimize the at least one process objective by maintaining a pressure within the at least one pipeline at a desired level, wherein the at least one processor is configured to maintain the pressure by causing the first process control system to adjust at least one of multiple valves for at least one of multiple wells associated with a hydrocarbon reservoir, the wells feeding the NGL production process.

12. The apparatus of claim 11, wherein the at least one processor is configured to maintain the pressure by causing the first process control system to adjust at least one of the valves based on an amount of inert gas provided by at least one of the wells.

13. The apparatus of claim 12, wherein:

the process objective is to maximize recovery of natural gas liquids while optimizing feed gas provided to the LNG production process; and the at least one process is configured to optimize the feed gas by maximizing, up to a threshold, an amount of the inert gas in the feed gas.

14. The apparatus of claim 11, wherein the process objective is profit.

15. The apparatus of claim 11, wherein the process objective is a quality of liquefied natural gas produced by the second process.

16. The apparatus of claim 11, wherein the process objective is a quantity of liquefied natural gas produced by the second process.

17. The apparatus of claim 11, wherein the process objective is a quantity of natural gas liquids produced by the first process.

18. The apparatus of claim 11, wherein the first process control system is optimized for maximum natural gas liquids production.

19. A computer program embodied on a computer readable medium, the computer program comprising computer readable program code for:

simultaneously controlling a first process control system that controls a first process and a second process control system that controls a second process, the first process comprising a natural gas liquids (NGL) production process, the second process comprising a liquefied natural gas (LNG) production process, the first process supplying at least one pipeline that feeds the second process; and optimizing at least one process objective using both the first and second process control systems, wherein the computer readable program code for optimizing the at least one process objective comprises computer readable program code for maintaining a pressure within the at least one pipeline at a desired level, wherein the pressure is maintained by causing the first process control system to adjust at least one of multiple valves for at least one of multiple wells associated with a hydrocarbon reservoir, the wells feeding the NGL production process.

20. The computer program of claim 19, wherein:

the process objective comprises maximizing recover of natural as liquids while optimizing feed gas provided to the LNG production process; and the computer readable program code for optimizing the at least one process objective comprises computer readable program code for maintaining the pressure by adjusting at least one of the valves based on an amount of inert gas provided by at least one of the wells, wherein the feed gas is optimized by maximizing, up to a threshold, an amount of the inert gas in the feed gas.

* * * * *

UNITED STATES PATENT AND TRADEMARK OFFICE
CERTIFICATE OF CORRECTION

| | | |
|---|---|---|
| PATENT NO. | : 7,500,370 B2 | Page 1 of 1 |
| APPLICATION NO. | : 11/394796 | |
| DATED | : March 10, 2009 | |
| INVENTOR(S) | : Brian A. Coward | |

It is certified that error appears in the above-identified patent and that said Letters Patent is hereby corrected as shown below:

In Column 12, line 29, delete "recover" and add --recovery--;
In Column 12, line 30, delete "as" and add --gas--.

Signed and Sealed this

Twenty-first Day of April, 2009

JOHN DOLL
*Acting Director of the United States Patent and Trademark Office*